Patented Mar. 6, 1945

UNITED STATES PATENT OFFICE 2,370,983

STABILIZATION OF SOILS

Abraham B. Miller, deceased, late of Newark, Del., by Hazel E. Miller, administratrix, Newark, Del., assignor to Hercules Powder Company, Wilmington, Del., a corporation of Delaware No Drawing. Application June 15, 1942, Serial No. 447,179

20 Claims. (Cl. 106—94)

This invention relates to stabilization of soils, and more particularly, to the stabilization of road soils and the like by the addition of a small amount of a mixture of Portland cement and pine wood resin.

Soil stabilization is the treatment of soils to correct the natural deficiencies thereof and to render them more suitable for use as road-building materials or the like. For example, in the case of some soils, poor load bearing qualities may be improved. In the case of other soils which have poor moisture resistance, they may be stabilized to prevent rutting, frost heaving, and other phenomena associated with weakening by water.

It has been proposed to prepare stabilized soils for use in road building by blending soils of various particle sizes and physical and chemical properties. For example, a soil which is hard and resists the abrasive and impact action of traffic may be blended with a soil which may provide for interlocking of the soil grains and thereby effect an increase in shear strength. Clay-like materials might be added to absorb water and maintain stability in dry weather. Silt might also be desired to act as a filler and to provide a capillary bond in the presence of water when the clay becomes weak by losing cohesion in wet weather. While such stabilized soil blends have met with some measure of success, they are highly disadvantageous in that their preparation requires grading and blending of an enormous volume of materials and may often require transporting the different soil ingredients from widely separated localities.

It has also been proposed to stabilize soils through the addition of deliquescent materials, such as calcium chloride, to prevent dusting and to prevent the roads from becoming muddy in wet weather. Also, water-soluble binders, such as sulfite liquor concentrate and distillery wastes, have been proposed. The use of such materials, however, is disadvantageous in that at best they provide only temporary stabilization.

Now, in accordance with the present invention, low-grade soils may be advantageously stabilized by mixing with them a small amount of a mixture of Portland cement and pine wood resin. The soils may or may not be blended first with aggregate or fines to increase their strength and serviceability, and, if desired, the mixture of Portland cement and pine wood resin may be used in combination with other stabilizing agents, for example, calcium chloride. Soils stabilized according to the method of the invention are readily prepared, requiring a minimum amount of handling and transportation of materials, and remain stabilized over long periods of time. They are suitable for use in the construction of dams, rivers, embankments, etc.; in packing underground pipe lines, conduits, foundations, and the like; and in base courses or surface courses for roads, runways, race tracks, tennis courts, playing fields, etc.

The material herein defined by the term "pine wood resin" is preferably a substantially petroleum hydrocarbon-insoluble pine wood resin. However, other pine wood resins, such as rosin, soaps, emulsions, and sizes thereof may likewise be utilized.

The resin which is characterized by the term "substantially petroleum hydrocarbon-insoluble pine wood resin" is a resinous material which may be prepared from pine wood, preferably from stump pine wood and which comprises the resinous residue remaining after separation of the rosin from the total resinous extract of the wood. Thus, the pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the petroleum hydrocarbon-insoluble resin. Extraction of this mixture with a petroleum hydrocarbon such as, for example, gasoline, dissolves and removes the rosin. After separation of the rosin, high in abietic acid, a resinous residue remains which is low in abietic acid and which is substantially insoluble in petroleum hydrocarbons. Alternatively, the residue of the initial coal tar hydrocarbon extract may be treated with a mixture of a petroleum hydrocarbon, as gasoline, and furfural and the two layers which form separated, in which case the petroleum hydrocarbon-insoluble pine wood resin is found dissolved in the furfural from which it may be obtained by evaporation of the furfural. Other methods of isolating the desired petroleum hydrocarbon-insoluble pine wood resin may be employed, if desired, such as with use of other solvents for extracting the total resin content from the wood. The resin may be defoamed by steaming or heat treated to remove volatile substances.

This resinous material is characterized by a dark red-brown color, cherry red in solution, and by substantial insolubility in petroleum hydrocarbons; but it will vary somewhat in its specific characteristics such as acid number, melting point, exact petroleum ether solubility, non-carboxylic hydroxyl content and iodine number, depending on the details of the extraction process utilized. The resin will meet or nearly meet the following specifications; namely, substantial insolubility in petroleum hydrocarbons, substantially complete solubility in alcohol, a methoxy content of from about 3 percent to about 7 percent (usually from about 4 percent to about 6 percent), an acid number in the range from about 80 to about 110, a drop melting point from about 95° C. to about 125° C., and a non-carboxylic hydroxyl content of about 5 to about 9 percent.

The soils which may be stabilized according to the invention are natural earthy materials, such as silts, clays, and mixtures thereof, or mixtures of silts and/or clays with cinders, pebbles, aggregates, or any other materials which by mechanical or other treatment may be made suitable for the purposes mentioned above.

The process of the invention comprises admixing with the soil to be stabilized from 5 to 25 pounds of Portland cement and from 2 to 10 pounds of pine wood resin per square yard for a 6 inch compacted depth. A method of applying such a mixture comprises first applying the cement and then adding the pine wood resin either in the form of a slurry, or in the powdered form, or in the form of an aqueous dispersion.

The addition of the mixture of Portland cement and pine wood resin to the soil may be carried out in a number of ways, the most convenient of which depends upon the particular type of soil and the conditions under which the operation is carried out. For example, the soil may first be graded or blended in the customary manner and the mixture of Portland cement and pine wood resin mixed therewith prior to grading. In stabilizing roads or the like already constructed, the surface layer of the road may be harrowed or plowed and the mixture of Portland cement and pine wood resin mixed in by scarifying, blading, or harrowing after which the road may be rolled and the surface compacted. Roads which are subjected to heavy traffic should then be given a wearing course of asphalt and aggregate. In some instances, it may be sufficient merely to sprinkle the mixture of Portland cement and pine wood resin over the road and mix into the soil by means of harrows and plows used in effective combination. In other instances, it may be preferable to apply the cement first and then add the pine wood resin in powdered form, or in the form of a slurry or aqueous dispersion and mix into the soil.

The proportion of resin required to secure the desired stabilization depends primarily upon the nature of the soil, some soils requiring more of the stabilizing agent than others to obtain the same degree of stabilization. Ordinarily, however, the use of between about 1.0 and about 5.0 percent and preferably between about 1.0 and about 3.0% of cement by weight of the dry compacted soil and between about 0.4 and about 2.0 percent and preferably between about 0.7 and about 2.0% of resin by weight of the dry compacted soil, will be found to produce good results.

To establish the stabilizing activity of pine wood resins, a laboratory method has been developed which gives an indication of the stabilizing activity which may be expected of the material in the field. It is verified by sufficient field experience to be used for making recommendations as to the amount of stabilizer to be used in field construction. The extent of packing the soil samples by the laboratory method is accurately controlled as well as the moisture in the samples at the time of packing. The samples are cured uniformly and tested with a capillary rise test which gives information as to the tendency of the soil to pick up water from a wet sub-grade when the soil is used for construction purposes. These capillary rise tests are run for only 24 hours since the dominant portion of the moisture pickup occurs during this period. The allowable moisture pickup is that required to bring the sample to ¾ optimum moisture which is based on the principle that if the soil does not increase in moisture content over ¾ optimum under adverse moisture conditions, it will continue to give adequate bearing capacity, and satisfactory service.

The laboratory method utilizes a sand tamper such as is the standard in the foundry industry. A quantity of soil is tamped in a cylindrical mold to form a cylinder of soil 2 inches in diameter and slightly over 1½ inches high. This mold is constructed so that instead of having a firm bottom, it rides on a false bottom which in its movement contributes packing on the bottom of the sample while the top is being tamped. After 10 tamps are delivered to the top of the sample, the mold is reversed and the bottom of the sample is also given 10 tamps, thereby providing a uniformity of packing not otherwise achieved. By means of a registering plunger, the sample is then moved in the mold so that any excess over the 1½ inch height projects above the top of the mold and can be struck off. This is done for the purpose of obtaining a series of samples exactly 1½ inches high. Work with this equipment has established that it is preferable to tamp samples containing pine wood resin-type stabilizer at about 90% of optimum moisture as determined by standard equipment (see A. S. T. M. designation: D558-40T). With tamping at this slightly low moisture content, there would be a tendency for the sample to show slightly lower density than that obtainable at optimum moisture. To obtain specimens having a density equivalent to maximum density, an extra weight is placed on the standard foundry sand rammer to increase the tamping force.

After a series of samples with varying amounts of stabilizer is prepared, they are allowed to dry back to 60% of optimum moisture in a pan over water. After the samples have gone through this curing and drying period, they are placed in ¼ inch of water for a period of 24 hours in a pan with a tight lid and are then reweighed to determine the moisture pickup. These figures are reported alongside a figure of the amount of moisture which that particular sample will have to pick up to reach ¾ of optimum moisture. If the figure of moisture pickup is less than that required to bring the sample to ¾ optimum moisture, sufficient stabilizer is considered to be present for field proportioning and construction.

The following examples illustrate several ways in which the principle of the invention has been demonstrated, but are not to be construed as limiting the same. In said examples, the "resin" referred to is in all cases, the substantially petroleum hydrocarbon-insoluble pine wood resin hereinbefore defined, and the cement referred to is Portland cement.

EXAMPLE 1

A very sandy soil lacking in sufficient binder material, as determined by mechanical analysis, having 14.9% of clay below a No. 40 sieve, negligible organic matter, optimum moisture content 7.0%, and maximum density of 109 lbs. per cu. ft., was classified as a Public Roads Administration class A-3 soil. Specimens 2 inches in diameter and 1½ inches high were made from this soil compacted to maximum density and using different quantities of resin and/or cement. These results are shown in Table 1 following. As will be noted under identification numbers 1 and 5 when resin or cement is used alone, unsatisfactory results were obtained. The specimen shown under identification number 1 in which cement alone was used did not prevent the rapid increase of moisture when the specimens are placed in ¼ inch of water, and under identification number 5, the use of resin alone had no action as there was insufficient binder material present. However, it will be noted under identification numbers 2, 3 and 4 in which resin and cement are used together, that much improved results were obtained as shown by the moisture pickup in these specimens as compared to the other specimens.

While the particular resin used in the above examples is a substantially petroleum hydrocarbon-insoluble pine wood resin, other pine wood resins and aqueous dispersions and soaps thereof may be used instead as long as the resinous constituent is deposited in the soil in an amount approximating that set forth for optimum results in the above examples. For example, FF wood rosin, B wood rosin, N wood rosin, F gum rosin, crystals which form in rosin sizes, usually referred to as 3:1 salts and rosins which have been treated by heating, oxidation, hydrogenation, liming, topping or polymerization show good stabilizing activity.

Methods for incorporating the resinous ma-

TABLE I

*Capillary rise test on resin—Cement—Treated soil*

[Type soil, A-3. Optimum moisture, 7.0%. Density, 109 lb./cu. ft.]

| Identity number | Material/sq. yd. 6 in. depth, pounds | Moisture at compaction | Moisture when placed in ¼ in. H₂O | Moisture content after 2 hours | Moisture content after 24 hours | Moisture pickup in 24 hours | Moisture pickup to give ¾ optimum | Remarks |
|---|---|---|---|---|---|---|---|---|
| 1 | 9.9—cement | 5.9 | 3.8 | 7.9 | 7.3 | 4.1 | 1.5 | Wet to top in 24 hr. |
| 2 | 9.9—cement / 3.0—resin | 5.7 | 3.8 | 6.2 | 6.2 | 2.4 | 1.5 | Wet ¾ way to top in 24 hr. |
| 3 | 11.7—cement / 3.0—resin | 5.7 | 3.8 | 4.8 | 5.2 | 1.4 | 1.5 | Wet ½ to top in 24 hr. |
| 4 | 11.7—cement / 5.0—resin | 5.7 | 4.0 | 4.6 | 5.4 | 1.4 | 1.3 | Wet ¼ to top in 24 hr. |
| 5 | 5.0—resin | 5.3 | 4.0 | Complete disintegration after 2 hr. | | | | |

EXAMPLE 2

A highly plastic soil, as determined by mechanical analysis, having 52.6% of clay below a No. 40 sieve, 4.0% organic matter, optimum moisture content 15.5%, and maximum density of 102.0 lbs. per cu. ft., was classified as a Public Roads Administration class A-7 soil. Specimens were made in accordance with the procedure in Example 1. Different quantities of resin or resin and cement were used as shown in Table 2, following. As will be noted under identification numbers 7, 8 and 9, that as much as 11 pounds of resin per square yard for a 6 inch compacted depth does not prevent border line moisture absorption and subsequent swelling of the soil particles. However, it will be noted under identification numbers 11 and 12 in which resin and cement are used together that excellent results were obtained by the use of 7 and 9 pounds, respectively, of resin per square yard with 23 pounds of cement, while under identification number 10 in which a mixture of 7 pounds of resin and 13.8 pounds of cement were used gave poor results, apparently due lack of binder.

terial in the soil, other than directly in the powdered form include: dispersing the powdered resins in water to form a slurry and applying said slurry to the soil; preparing an aqueous resin suspension having a dispersing agent for said resin or containing a small amount of alkali, to saponify a minor proportion of the resin and applying said suspension to the soil, if desired, adding a small amount of an anti-foaming agent, such as kerosene, to reduce foaming; preparing a soap, such as sodium, potassium and ammonium soaps, or a size containing predominant amounts of saponified resin and applying said soap or size to the soil in the form of an aqueous dispersion; preparing an aqueous dispersion of non-alkaline free resin, said dispersion containing a dispersing agent, such as ammonium hydroxide, for said resin and a protective colloid, such as casein, and applying said dispersion to the soil.

It is observed in the tables above that cement individually or resin individually will not give the results obtained by their combination. Cement added to the soil and properly worked provides a bond to the soil particles, but it does

TABLE 2

*Capillary rise test on resin—Treated soil*

[Type soil, A-7. Optimum moisture, 15.5. Density, 102 lb./cu. ft.]

| Identity number | Material/sq. yd. 6 in. depth, pounds | Moisture at compaction | Moisture when placed in ¼ in. H₂O | Moisture content after 2 hours | Moisture content after 24 hours | Moisture pickup in 24 hours | Moisture pickup to give ¾ optimum | Remarks |
|---|---|---|---|---|---|---|---|---|
| 7 | 7.0—resin | 14.6 | 8.9 | 9.8 | 12.1 | 3.2 | 2.7 | Soft to ½ in. Slight swelling. |
| 8 | 9.0—resin | 14.1 | 8.7 | 10.6 | 13.5 | 4.8 | 2.9 | Soft to 1 in. Bad swelling. |
| 9 | 11.0—resin | 12.8 | 8.3 | 9.5 | 11.6 | 3.3 | 3.3 | Soft to ½ in. Slight swelling. |
| 10 | 7.0—resin / 13.8—cement | 11.8 | 8.5 | 13.3 | 15.3 | 6.8 | 3.1 | Water to top in 1.45. |
| 11 | 7.0—resin / 23.0—cement | 11.8 | 8.5 | 9.7 | 11.2 | 2.7 | 3.1 | Water to ¾ in. in 2 hours. Water to ½ in. in 24 hours. |
| 12 | 9.0—resin / 23.0—cement | 12.1 | 8.6 | 9.7 | 10.4 | 1.8 | 3.0 | Water to ¾ in. in 24 hours. | not prevent the soil from absorbing an excessive amount of water. Resin properly added to the soil prevents the moisture content from increasing to any great extent, but it does not provide bond. The combination of cement and resin used together in a soil produces the desired results of bond of the soil particles and water repellancy.

By varying the proportion of cement and resin as well as the character of the soil itself, a wide variety of soil compositions having predetermined characteristics may be prepared.

Other modes of applying the principle of the invention may be employed instead of those explained, change being made as regards the methods or compositions herein disclosed, provided the method or the ingredients stated by any of the following claims, or the equivalent of such stated methods or ingredients be employed.

What is claimed and desired to be protected by Letters Patent is:

1. A method of stabilizing soil which comprises mixing with the soil Portland cement and a powdered pine wood resin, said Portland cement and said resin being incorporated in amount from about 1.0 to about 5.0% and from about 0.4 to about 2.0%, respectively, by weight of dry compacted soil.

2. A method of stabilizing soil which comprises forming an aqueous conglomerate of soil, Portland cement and a pine wood resin, said Portland cement and said resin being incorporated in amount from about 1.0 to about 5.0% and from about 0.4 to about 2.0%, respectively, by weight of dry compacted soil and distributing the same as a surface course.

3. A method of stabilizing soil which comprises mixing with the soil Portland cement and an aqueous slurry of powdered pine wood resin, said Portland cement and said resin being incorporated in amount from about 1.0 to about 5.0% and from about 0.4 to about 2.0%, respectively, by weight of dry compacted soil.

4. A method of stabilizing soil which comprises mixing with the soil Portland cement and an aqueous suspension of pine wood resin, said Portland cement and said resin being incorporated in amount from about 1.0 to about 5.0% and from about 0.4 to about 2.0%, respectively, by weight of dry compacted soil.

5. A method of stabilizing soil which comprises mixing with the soil Portland cement and an aqueous suspension of pine wood resin, said suspension containing a dispersing agent for said resin, said Portland cement and said resin being incorporated in amount from about 1.0 to about 5.0% and from about 0.4 to about 2.0%, respectively, by weight of dry compacted soil.

6. A method of stabilizing soil which comprises mixing with the soil Portland cement and an aqueous dispersion of a soap of pine wood resin, said Portland cement and said resin being incorporated in amount from about 1.0 to about 5.0% and from about 0.4 to about 2.0%, respectively, by weight of dry compacted soil.

7. A method of stabilizing soil which comprises mixing with the soil Portland cement and an aqueous dispersion of non-alkaline free pine wood resin, said Portland cement and said resin being incorporated in amount from about 1.0 to about 5.0% and from about 0.4 to about 2.0%, respectively, by weight of dry compacted soil, said dispersion containing a dispersing agent and a protective colloid.

8. A method of stabilizing soil which comprises mixing with the soil Portland cement and an aqueous dispersion of a size of pine wood resin, said Portland cement and said resin being incorporated in amount from about 1.0 to about 5.0% and from about 0.4 to about 2.0%, respectively, by weight of dry compacted soil, said size containing predominant amounts of saponified pine wood resin.

9. A stabilized soil containing a mixture of Portland cement and a pine wood resin, said Portland cement and said resin being present in amount from about 1.0 to about 5.0% and from about 0.4 to about 2.0%, respectively, by weight of dry compacted soil.

10. A stabilized soil containing a mixture of Portland cement, pine wood resin, and insoluble salts, said Portland cement and said resin being present in amount from about 1.0 to about 5.0% and from about 0.4 to about 2.0%, respectively, by weight of dry compacted soil.

11. A stabilized soil having dispersed therein Portland cement, a pine wood resin, and a dispersing agent for said resin, said Portland cement and said resin being present in amount from about 1.0 to about 5.0% and from about 0.4 to about 2.0%, respectively, by weight of dry compacted soil.

12. A stabilized soil having dispersed therein Portland cement, and a soap of pine wood resin, said Portland cement and said resin being present in amount from about 1.0 to about 5.0% and from about 0.4 to about 2.0%, respectively, by weight of dry compacted soil.

13. A stabilized soil having dispersed therein Portland cement, a non-alkaline free pine wood resin, a dispersing agent, and a protective colloid, said Portland cement and said resin being present in amount from about 1.0 to about 5.0% and from about 0.4 to about 2.0%, respectively, by weight of dry compacted soil.

14. A stabilized soil having dispersed therein Portland cement, and a size of pine wood resin containing predominant amounts of saponified pine wood resin, said Portland cement and said resin being present in amount from about 1.0 to about 5.0% and from about 0.4 to about 2.0%, respectively, by weight of dry compacted soil.

15. A method of stabilizing soil which comprises mixing with the soil not more than about 5% Portland cement by weight of dry compacted soil and a substantial proportion of pine wood resin.

16. A method of producing a substantially water-resistant structural material which comprises thoroughly mixing soil with not more than about 5% Portland cement by weight of dry compacted soil and a substantial proportion of pine wood resin.

17. A method of producing a substantially water-resistant structural material which comprises thoroughly mixing soil with Portland cement and pine wood resin, said Portland cement and said resin being incorporated in amount from about 1.0 about 5.0% and from about 0.4 to about 2.0%, respectively, by weight of dry compacted soil.

18. A stabilized soil containing a mixture of not more than about 5% Portland cement by weight of dry compacted soil and a substantial proportion of pine wood resin.

19. A substantially water-resistant structural material comprising soil, not more than about 5% Portland cement by weight of dry compacted soil and a substantial proportion of pine wood resin.

20. A substantially water-resistant structural material comprising soil, Portland cement and pine wood resin, said Portland cement and said resin being present in amount from about 1.0 to about 5.0% and from about 0.4 to about 2.0%, respectively, by weight of dry compacted soil.

HAZEL E. MILLER,
*Administratrix of the Estate of Abraham B. Miller, Deceased.*